United States Patent
Spencer et al.

[11] Patent Number: 6,032,978
[45] Date of Patent: Mar. 7, 2000

[54] INFLATABLE KNEE BOLSTER

[75] Inventors: Graham Thornton Spencer, Troy; James Kent Conlee, Dayton; Nicole M. Mahmood, New Carlisle; George E. Marshall, Tipp City, all of Ohio; Samin A. Wahabi, Toronto, Canada; Martin B. Fisher, Beverly Hills, Mich.

[73] Assignees: ABC Group Interior Systems, Etobicoke, Canada; General Motors Corp., Detroit, Mich.

[21] Appl. No.: 09/130,939

[22] Filed: Aug. 7, 1998

[51] Int. Cl.⁷ .............................. B60R 21/22; B60R 21/04
[52] U.S. Cl. .......................... 280/730.1; 280/753
[58] Field of Search .................. 280/730.1, 751, 280/753

[56] References Cited

U.S. PATENT DOCUMENTS

| | | | |
|---|---|---|---|
| 4,198,075 | 4/1980 | Kob et al. | 280/753 |
| 5,312,131 | 5/1994 | Kitagawa et al. | 280/730.2 |
| 5,324,070 | 6/1994 | Kitagawa et al. | 280/730.1 |
| 5,382,051 | 1/1995 | Glance | 280/751 |
| 5,476,283 | 12/1995 | Elton | 280/753 |
| 5,536,043 | 7/1996 | Lang et al. | 280/753 |
| 5,570,901 | 11/1996 | Fyrainer | 280/730.1 |
| 5,775,729 | 7/1998 | Schneider et al. | 280/730.1 |
| 5,816,613 | 10/1998 | Specht et al. | 280/753 |
| 5,931,493 | 8/1999 | Sutherland | 280/730.1 |

*Primary Examiner*—Kenneth R. Rice
*Attorney, Agent, or Firm*—Kathryn A. Marra

[57] ABSTRACT

An inflatable knee bolster for a vehicle occupant is mounted to the bottom of the vehicle's instrument panel. Having an outer wall that is projected outwardly from a stored position to an extended position adjacent the occupant's knees by inflation of an expansible chamber by an inflator, characterized by. The bolster is an expansible chamber comprising a unitary hollow blow molded polypropylene body that has an outer wall and an inner wall which are interconnected at their bottoms by a bottom wall and at their tops and sides by U-shaped normally folded accordion pleats. These pleats extend from the bottom side corners of the body up the sides and across the top of the body. A pair of spaced attachment tabs extend from the bottom wall for attachment to vehicle structure, and a pair of spaced frangible tabs extending from the top of the outer wall for attachment to vehicle structure to maintain the outer wall in stored position. An inflator is mounted on the hollow body in fluid communication with the interior of the body and, when activated, pressurizes the expansible body to unfold the accordion pleats to expand the body. This breaks the frangible tab and projects the front wall outwardly to extended position adjacent the occupant's knees. A pair of vent holes formed in the inner wall enable controlled depressurization of the bolster.

10 Claims, 6 Drawing Sheets

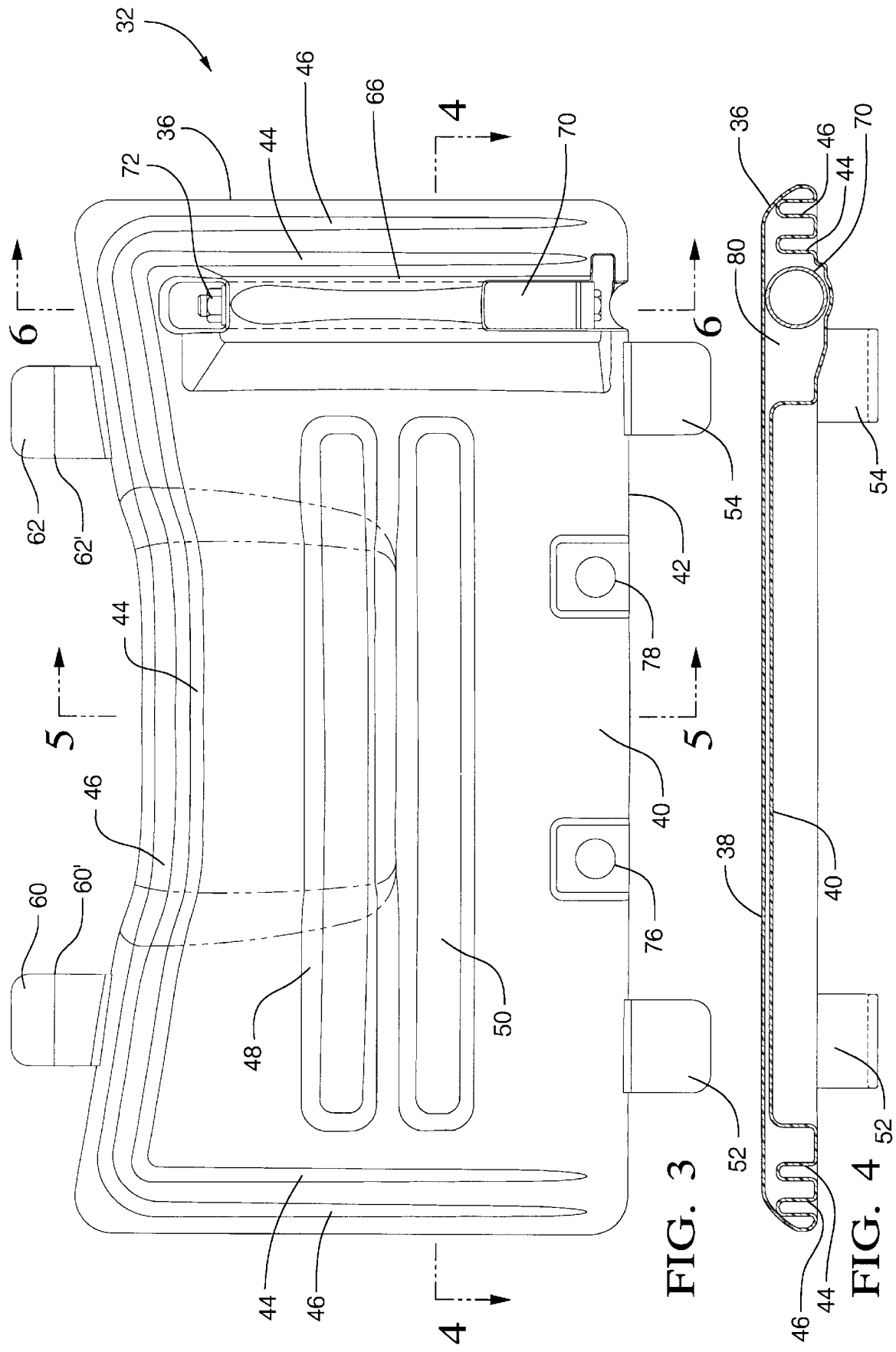

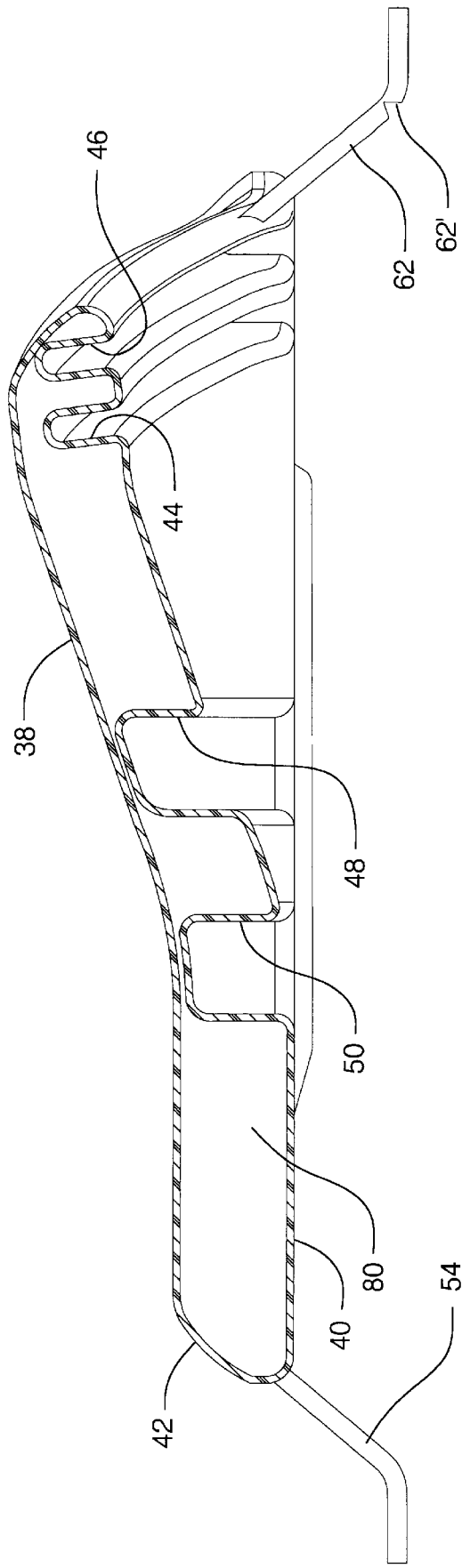
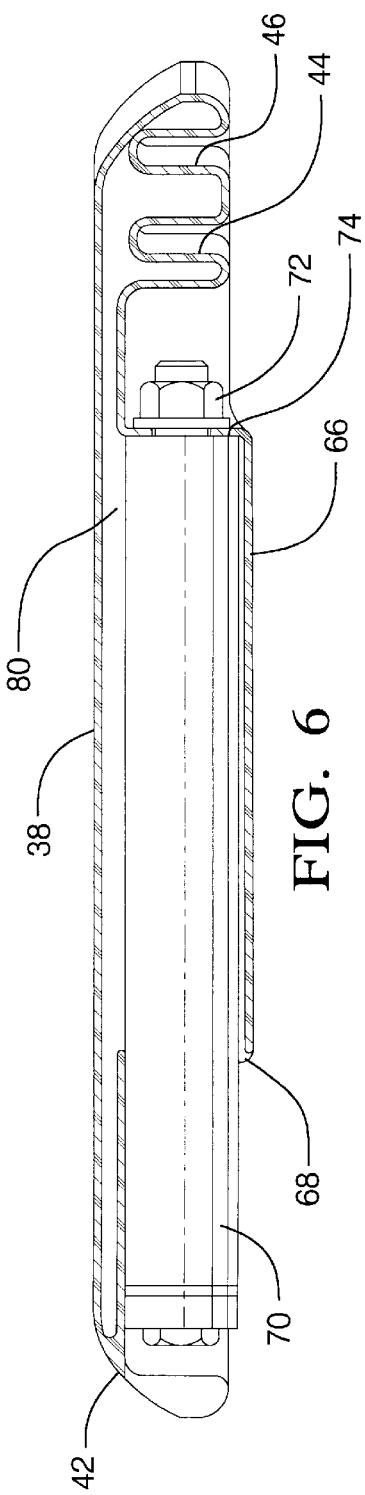
FIG. 5
FIG. 6

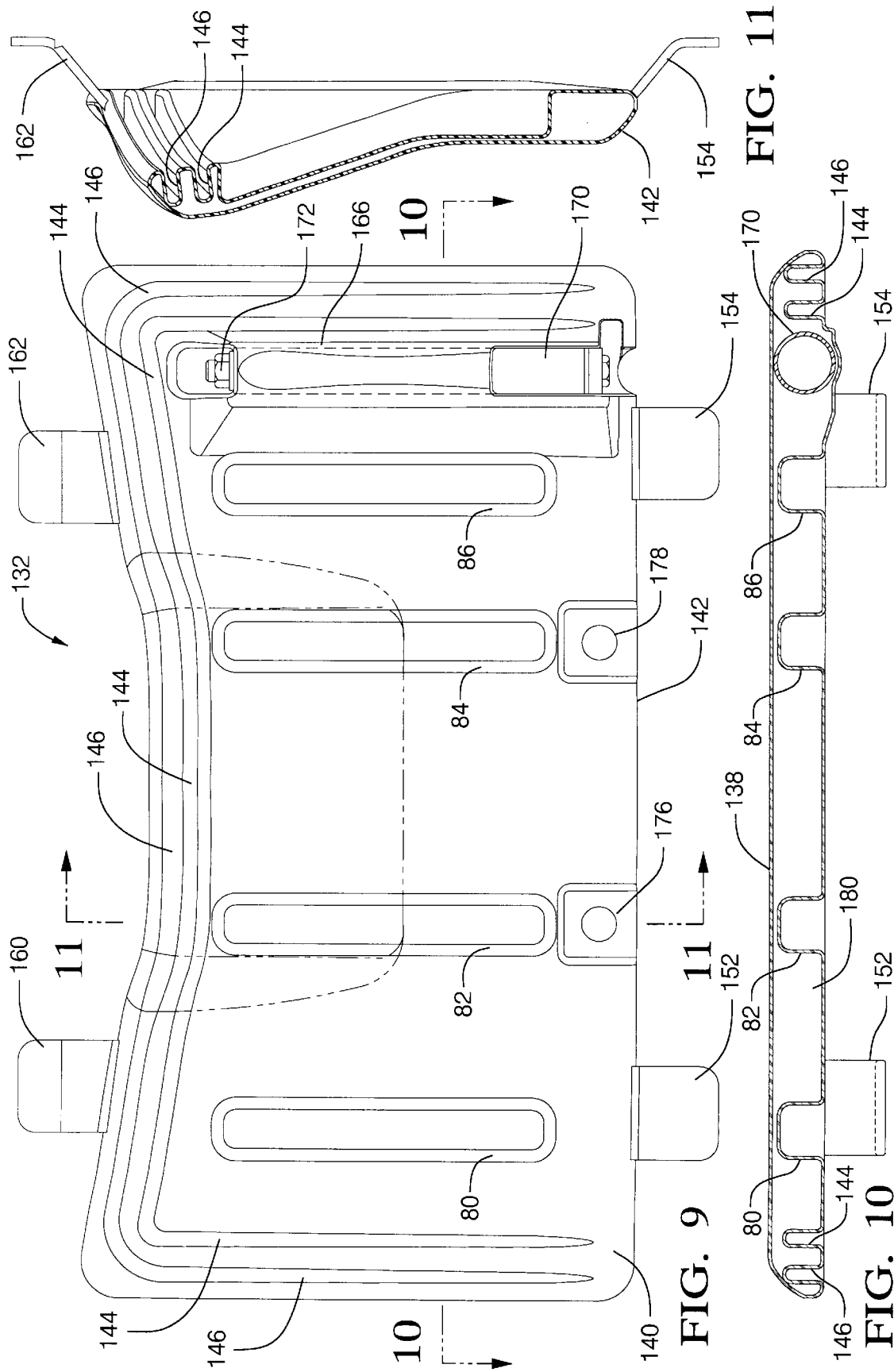

6,032,978

INFLATABLE KNEE BOLSTER

TECHNICAL FIELD

This invention related generally to inflatable vehicle protective devices and, more particularly, to an inflatable knee bolster.

BACKGROUND OF THE INVENTION

Inflatable knee bolsters have been developed to enhance vehicle occupant protection in the event of sudden vehicle deceleration. Such devices increase the duration of deceleration of occupants' femurs and control upper torso kinematics during a frontal impact event. The bolster impact surface is moved from a stored position to an extended position to intercept an occupant's knees early in the impact event. This allows the knees more time to decelerate to the vehicle's final velocity. The initial positioning of the bolster impact surface in a retracted, stored position allows more styling flexibility and enhances occupant ingress and egress.

Current inflatable knee bolster installations comprise an inflatable air bag sandwiched between an impact surface and a reaction surface. When the inflator is triggered, the air bag expands to move the impact surface a predetermined distance to active position. This position is determined by tethers between the reaction and impact surfaces. These installations comprise numerous parts, bits and pieces and require careful installation.

It would be desirable to provide a simpler inflatable knee inflatable bolster which would be less costly to manufacture and assemble into the vehicle.

SUMMARY OF THE INVENTION

It is an object of this invention to provide a simpler inflatable knee bolster which would be less costly to manufacture and assemble into the vehicle.

In one aspect this invention features an inflatable bolster for a vehicle occupant having an outer wall that is projected outwardly from a stored position to an extended position by inflation of an expansible chamber by an inflator. The expansible chamber includes a unitary hollow body having an outer wall and an inner wall interconnected by U-shaped normally folded accordion pleats. An attachment tab extends from the top of the chamber for attachment to vehicle structure, and another attachment tab extends from the bottom of the chamber for attachment to vehicle structure. Alternatively, the bottom of the outer surface could be attached directly to vehicle structure. The inflator is mounted on the hollow body in fluid communication with the interior of the body and is operable to pressurize the expansible body to unfold the accordion pleats to expand the body and project the front wall outwardly to the extended position adjacent the occupant.

In another aspect of this invention, the bolster is an inflatable knee bolster having an outer wall that is projected outwardly to an extended position adjacent the occupant's knees by inflation of an expansible chamber by an inflator. The outer and inner walls are interconnected at their bottoms by a bottom wall and at their tops and sides by the accordion pleats which are U-shaped and extend from the bottom side corners up the sides and across the top of the body. The top tab is a frangible tab which is broken by expansion of the expansible chamber, allowing the outer wall to pivot about the bottom wall and extend.

Preferably, tethers on the frangible tab limit movement of the outer wall. Also, vent holes are preferably included to provide subsequent controlled deflation of the expansible body. The hollow body is preferably a blow molding of polypropylene.

These and other objects and features of this invention will become more readily apparent upon reference to the following detailed description of a preferred embodiment, as illustrated in the accompanying drawings, in which:

BRIEF DESCRIPTION OF THE DRAWINGS

FIG. 3 is a rear view of the inflatable knee bolster;

FIG. 4 is a sectional view taken along line 4—4 of FIG. 3;

FIG. 5 is a sectional view taken along line 5—5 of FIG. 3;

FIG. 6 is a sectional view taken along line 6—6 of FIG. 3;

FIG. 9 is a rear view of another embodiment of inflatable knee bolster according to this invention;

FIG. 10 is a sectional view taken along line 10—10 of FIG. 9; and

FIG. 11 is a sectional view taken along line 11—11 of FIG. 9.

DESCRIPTION OF A PREFERRED EMBODIMENT

Figure 1:
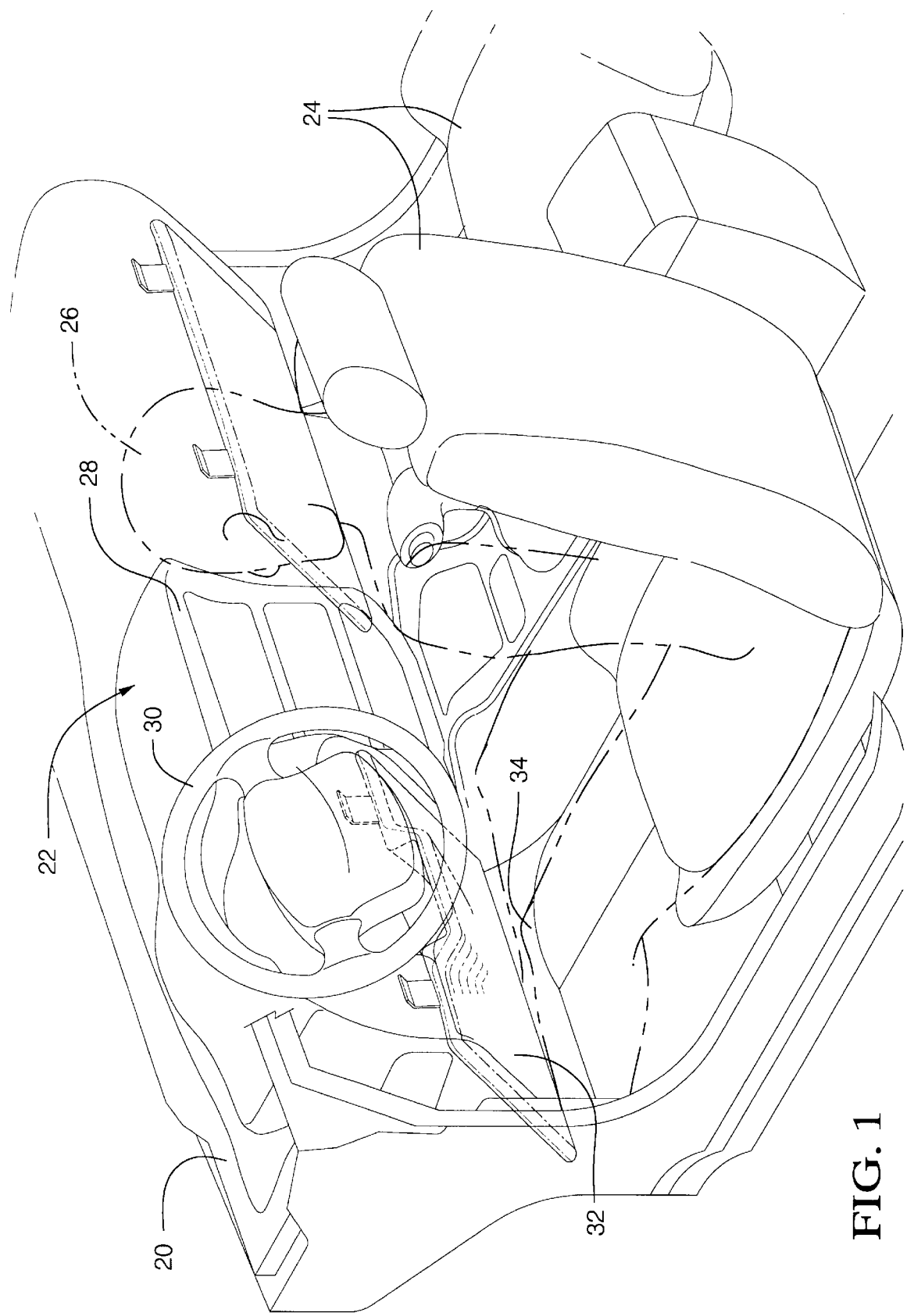
FIG. 1 is a perspective view of the driver's side of a vehicle passenger compartment showing the position of the inflatable knee bolster of this invention in stored position.
Figure 2:
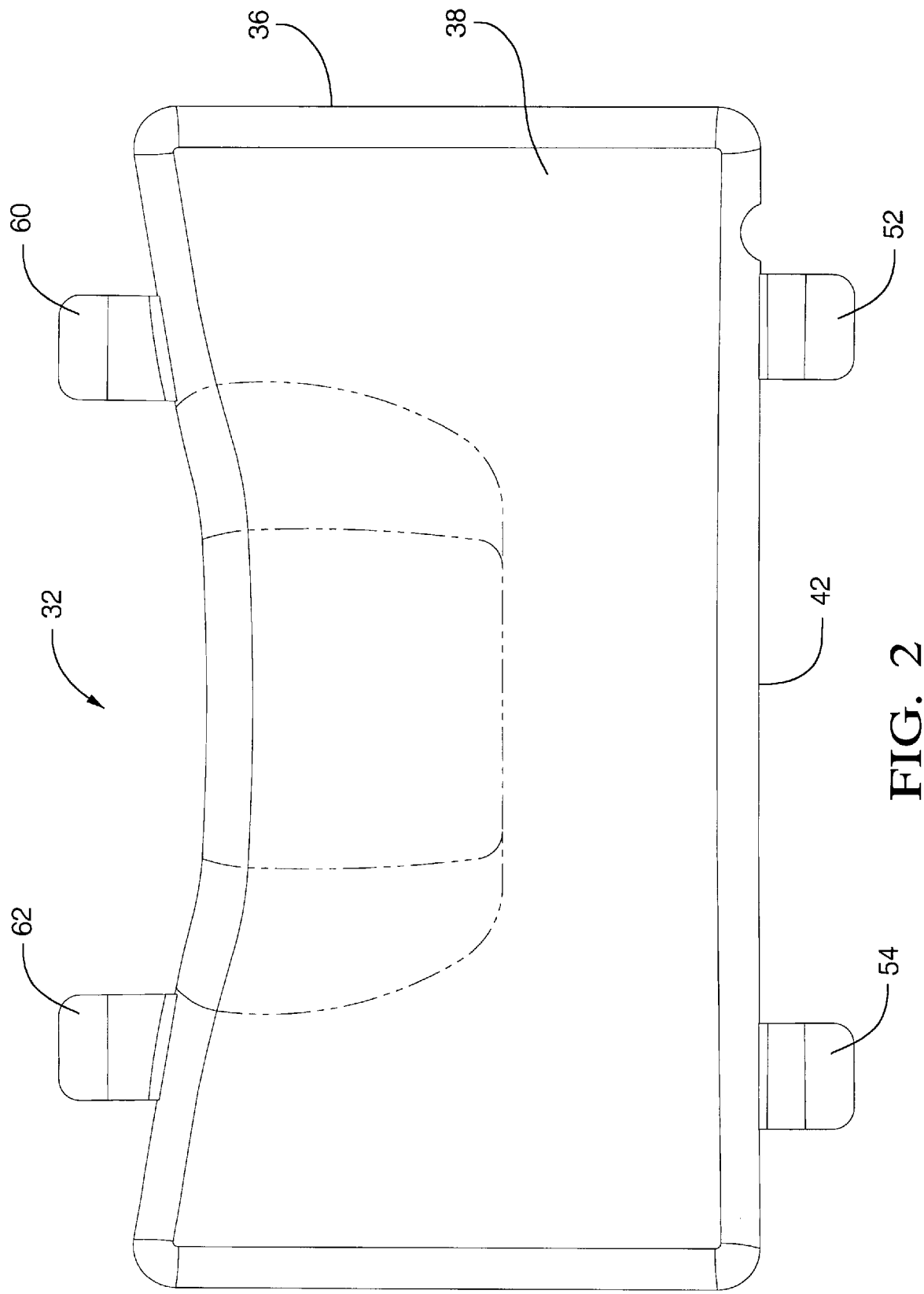
FIG. 2 is a front view of the inflatable knee bolster.
Figure 8:
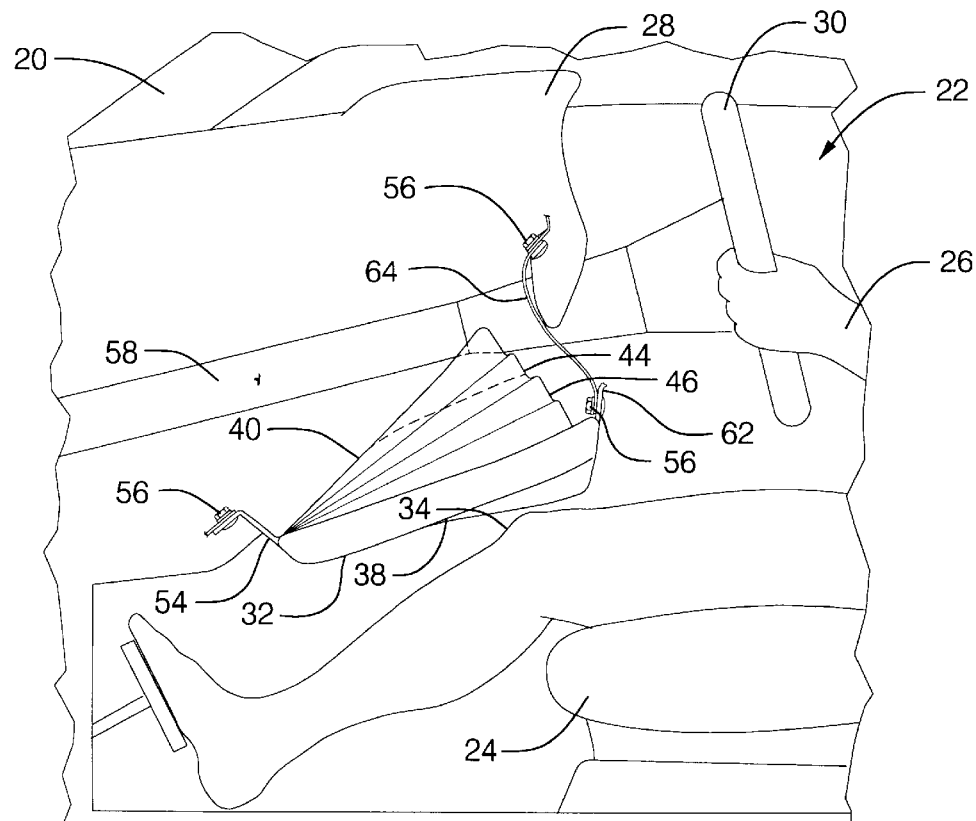
FIG. 8 is a view similar to FIG. 7, showing the inflatable knee bolster in extended position.

Referring to FIG. 1, an automotive vehicle 20 has a passenger compartment 22 that includes front seats 24 for the occupants, including a driver 26. The usual instrument panel 28 flanks the steering wheel 30. An inflatable knee bolster 32 is mounted on the underside of instrument panel 28 adjacent the knees 34 of driver 26. A similar arrangement is provided for the passenger. Knee bolster 34 is nearly flush with the underside of instrument panel 28, as best seen in FIG. 8.

Referring now to FIGS. 2–7, knee bolster 32 comprises a unitary hollow main body 36 formed of a blow molded polypropylene-based or other thermoplastic material. Main body 36 includes a front or outer wall 38 and a spaced inner wall 40 that are interconnected by a bottom wall 42. At their tops and sides, outer wall 38 and inner wall 40 are interconnected by inverted U-shaped accordion pleats 44 and 46 which are normally folded, as shown.

Figure 7:
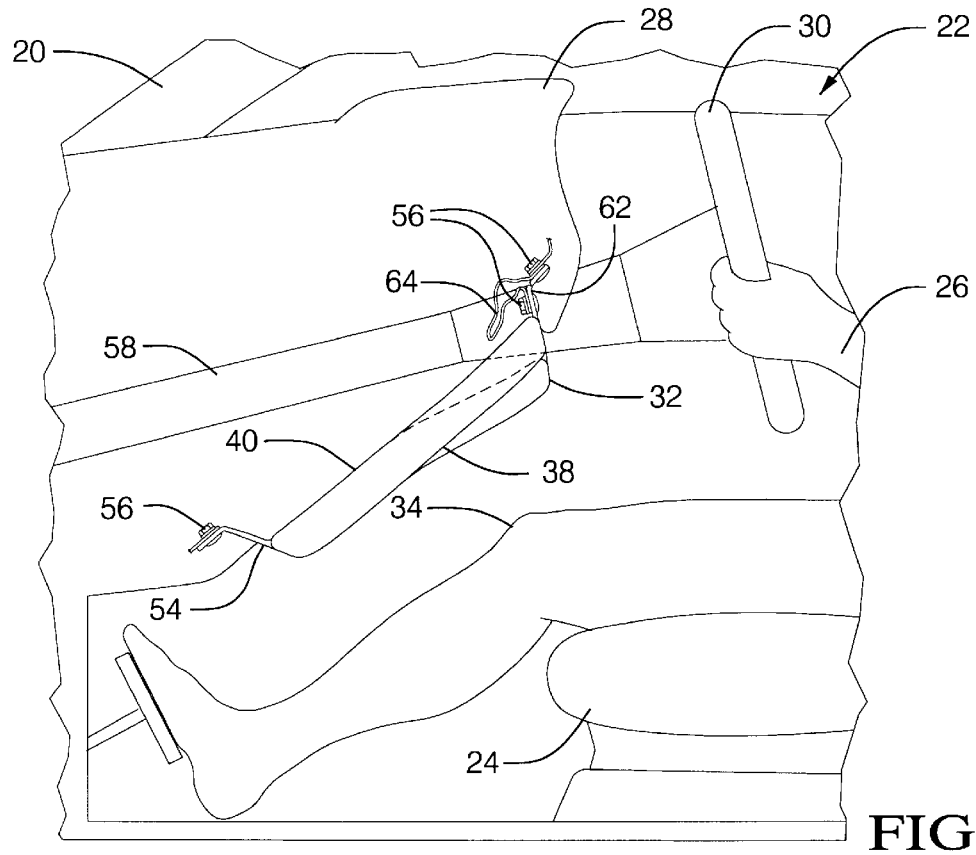
FIG. 7 is a partial side view of the passenger compartment of FIG. 1, showing the inflatable knee bolster in stored position.

A pair of transverse strengthening ribs 48 and 50 are formed in inner wall 40 and extend inwardly of body 36 into engagement with the rear side of outer wall 38, as best seen in FIG. 5. A pair of integral lower mounting tabs 52 and 54 extend from bottom wall 42 for attachment by screws 56 to the bottom 58 of instrument panel 28 as best seen in FIG. 7. A pair of integral upper frangible mounting tabs 60 and 62, having weakened sections 60' and 62', extend upwardly from body 36 for attachment to instrument panel bottom 58 by screws 56. A tether 64 is fastened by screws 56 to both ends of upper mounting tabs 60 and 62.

A cavity 66 is formed in inner wall 40 and includes an opening 68 for receiving a cylindrical inflator 70 that is bolted at 72 to the upper wall of cavity 66, as best shown in FIGS. 3 and 6. Inner wall 40 also includes a pair of spaced vent holes 76 and 78, as shown in FIG. 3. With this unitary construction, main body forms a hollow chamber 80 that is air tight except for vent holes 76 and 78.

In the event of vehicle deceleration during a frontal impact event, an acceleration sensor (not illustrated) actuates inflator 70, which pressurizes main body 36. This forces main body 36 to expand by breaking frangible tabs 60 and 62 at 60' and 62' and unfolding accordion pleats 44 and 46. This projects bolster outer wall 38 outwardly to the extended position shown in FIG. 8 adjacent occupant's knees 34. This movement to extended position is limited by the length of tethers 64. Thus, bolster outer wall 38 is in position to engage the occupant's knees 34 and lower leg to increase their duration of deceleration during vehicle deceleration.

An alternative embodiment of inflatable knee bolster, denoted 134, is shown in FIGS. 9–11, where parts similar or identical to parts in the FIGS. 1–8 embodiment are identified by like numbers increased by 100. Here, the main difference is the inclusion of four spaced vertical strengthening ribs 80, 82, 84 and 86 which are formed in inner wall 140. These replace ribs 48 and 50 in the FIGS. 1–8 embodiment and provide the same strengthening function. Functioning of this embodiment is the same.

Thus, this invention provides a simpler inflatable knee bolster. While only preferred embodiments have been shown and described, many modifications thereof are contemplated within the scope of this invention, as defined by the appended claims.

For example, the accordion pleats could have a different orientation, be different in number, take a different form, or be continuous around the inflatable body. The inflatable body could be used elsewhere in a vehicle, such as in a side impact application. Also, other materials could be used for the unitary body, although a polypropylene-based material is preferred. Also, the frangible tabs could be eliminated, and the outward movement of the outer surface would be limited by the accordion pleats. It will also be appreciated that the outer wall 38 of the knee bolster 32 could serve as a visible show surface matching the instrument panel 28 without additional covering, if desired.

While the present invention has been described as carried out in specific embodiments thereof, it is not intended to be limited thereby, but intended to be construed broadly within the scope and spirit of the claims.

What is claimed is:

1. An inflatable knee bolster for a vehicle occupant having an outer wall that is projected outwardly from a stored position to an extended position adjacent the occupant's knees by inflation of an expansible chamber by an inflator, characterized by the expansible chamber comprising a unitary hollow body comprising said outer wall and an inner wall interconnected at their bottoms by a bottom wall and at their tops and sides by U-shaped normally folded accordion pleats which extend from the bottom side corners up the sides and across the top of the body, at least one attachment extending from the bottom wall for attachment to vehicle structure, at least one frangible attachment tab extending from the top of the outer wall for attachment to vehicle structure to maintain the outer wall in stored position, and said inflator being mounted on the hollow body in fluid communication with the interior of the body and being selectively operable to pressurize the expansible body to unfold the accordion pleats to expand the body to break the frangible attachment tab and project the front wall outwardly to extended position.

2. The expansible knee bolster of claim 1, further characterized by the unitary hollow body being a blow-molded polypropylene material.

3. The expansible knee bolster of claim 1, further characterized by a strengthening rib formed in the inner wall projecting through the hollow body toward the outer wall.

4. The expansible knee bolster of claim 3, further characterized by a the inner wall including a spaced plurality of said strengthening ribs.

5. The expansible knee bolster of claim 1, further characterized by one of said walls including at least one vent hole to provide subsequent controlled collapse of the body.

6. The expansible bolster of claim 1, further characterized by the frangible tab having two ends divided by a frangible section, and by including a tether connecting the two sides to limit movement of the outer wall to extended position.

7. An inflatable bolster for a vehicle occupant having an outer wall that is projected outwardly from a stored position to an extended position by inflation of an expansible chamber by an inflator, characterized by the expansible chamber comprising a unitary hollow body comprising said outer wall and an inner wall interconnected by U-shaped normally folded accordion pleats, means for attaching the top of the chamber to vehicle structure, means for attaching the bottom of the chamber to vehicle structure, said inflator being mounted on the hollow body in fluid communication with the interior of the body and being selectively operable to pressurize the expansible body to unfold the accordion pleats to expand the body and project the front wall outwardly to extended position adjacent the occupant.

8. The expansible bolster of claim 7, further characterized by one of said walls including at least one vent hole to provide subsequent controlled collapse of the body.

9. The expansible bolster of claim 7, further characterized by frangible means which maintains the outer wall in stored position until broken by pressurization of the expansible body.

10. The expansible chamber of claim 9, further characterized by including a tether extending between the outer wall and the vehicle structure to limit movement of the outer wall to extended position.

\* \* \* \* \*